United States Patent [19]

Panasewich

[11] Patent Number: 4,555,862
[45] Date of Patent: Dec. 3, 1985

[54] TACKLE BOX

[76] Inventor: Raymond Panasewich, 150 Glacier Ct., Oregon City, Oreg. 97045

[21] Appl. No.: 564,207

[22] Filed: Dec. 22, 1983

[51] Int. Cl.$^4$ ............................................... A01K 97/00
[52] U.S. Cl. ......................................... 43/54.1; 43/57.1
[58] Field of Search ............................... 43/54.1, 57.1; 206/315.11, 349; 224/920; 33/138; 242/134, 132, 137, 137.1, 138

[56] References Cited

U.S. PATENT DOCUMENTS

| | | | |
|---|---|---|---|
| 417,979 | 12/1889 | Borcherdt | 43/57.1 |
| 1,099,766 | 6/1914 | Prince | 242/137 |
| 3,171,566 | 10/1962 | Mitchell | 206/315.11 |
| 3,410,018 | 11/1968 | Woolworth | 43/54.1 |
| 3,461,599 | 8/1969 | Sylvester | 43/57.1 |
| 3,490,169 | 1/1970 | Tweed | 43/57.1 |
| 3,506,215 | 4/1970 | Krikorian | 242/134 |
| 3,962,815 | 6/1976 | Christensen | 43/54.1 |
| 4,026,063 | 5/1977 | Allen et al. | 43/54.1 |
| 4,434,952 | 3/1984 | Czerwinski et al. | 33/138 |

FOREIGN PATENT DOCUMENTS

| | | | |
|---|---|---|---|
| 991765 | 5/1949 | France | 242/137.1 |
| 273046 | 4/1951 | Switzerland | 242/137.1 |

Primary Examiner—Nicholas P. Godici
Assistant Examiner—Samuel M. Heinrich
Attorney, Agent, or Firm—Harlan E. Hummer

[57] ABSTRACT

A unique fishing tackle box is described as having a number of separate housings which are adjacent the front of the box and in which spools of fishing leader line are mounted for rotating freely about their own axes which are, generally, in alignment and extend longitudinally of the box in parallel relation to the front of the box. The loose free ends of leader line from the spools, extend exteriorly of the box through a row of openings in the front of the box. Means are provided exteriorly of the box for cutting leader line as it is pulled from the openings.

The tackle box is also provided with a flexible measuring tape that is mounted within the top cover of the box and is extensible therefrom, such that the top cover acts as an abutment from which a fish is measured using the measuring tape.

The tackle box includes a special pivot pin on which a spool of fishing line is mounted for rotating freely as line is unreeled therefrom onto the reel of a fishing rod. The tackle box has other special features, such as a top cover which is compartmented into separate storage bins that are covered by a transparent lid for easy observation of the fishing tackle that is stored in the bins. The bottoms of the storage bins are covered with cork or styrofoam in which the fish hooks are embedded to keep them from becoming entangle with other fishing gear or tackle. The tackle box is also provided with a plurality of storage trays which are conventionally linked together for rotation from a stacked position to a stepped one.

19 Claims, 4 Drawing Figures

TACKLE BOX

BACKGROUND OF THE INVENTION

The invention relates to tackle boxes that are used by fishermen to store their fishing gear or tackle, such as fishing lures, leaders and lines, especially tackle boxes that are used by deep sea fishermen who generally use a number of different gauge leader lines during a morning or afternoon of fishing, contrary to other fishermen who fish smaller lakes or streams for a particular type of fish.

Fishing tackle boxes, presently on the market, are poorly equipped to make readily available to fishermen, a number of different leader lines or fishing lines which are normally wound or reeled on spools that are stored at one end of the tackle box, or scattered throughout the box, where the loose ends of the lines, hanging from the spools, become tangled with other fishing gear.

U.S. Pat. No. 3,490,169 makes a vain attempt to solve this problem by the provision of a separate space in which two spools of fishing line are stored on their sides. The lines extend from the spools through adjacent openings in the tackle box, so that they are readily available to a fisherman without opening the box. It can be appreciated from a study of this patent, that the structure for storing the spools of fishing line is impractical and severely limits the number of spools which can be accommodated in the tackle box, unless the box is of gigantic proportions, or the lines are allowed to protrude from all four sides of the box. This patent also discloses a tackle box which utilizes a transparent lid and sides through which tackle, in the box, is easily observed.

Existing tackle boxes are also poorly equipped to help fishermen replace or put new fishing line on the reels of their fishing rods. Moreover, they provide no help to a struggling fishermen attempting to measure a fish to determine if its within the legal limit. The invention is specifically designed to help overcome the aforementioned problems which, at certain times, become insurmountable.

Briefly stated, the invention is in a fishing tackle box which, when horizontally disposed, is comprised of two portions, a larger bottom portion and a top portion which acts as a lid or cover for the bottom portion that has opposing sidewalls, endwalls, and a connecting bottom wall which form a compartment in which fishing tackle is stored. The top portion is hinged to the bottom portion and comprises opposing sides, ends and top which form a tray that is divided into bins which are covered by a transparent lid which is hinged to the top portion. Means are provided in the compartment, adjacent one of the sidewalls, for storing a number of spools of different gauge fishing or leader line in individual housings which are separated from each other and in which the spools are free to rotate about generally the same axis. The spools are mounted in side-by-side, axially aligned relationship, and the free loose ends of the lines extend through aligned openings in the housings and adjacent sidewall of the tackle box. Means are supplied exteriorly of the tackle box, adjacent the openings, for cutting the leader lines when a sufficient amount of line has been unreeled from one of the spools. A flexible, spring-biased measuring tape is provided in the top portion and is extensible therefrom, for measuring the length of a fish, the top portion acting as an abutment from which the fish is measured, when the tackle box is closed. A pivot pin on which a spool of fishing line is freely rotatable, is pivotally mounted within the compartment for rotation from a first position within the compartment to a second position where the pin extends vertically out of the compartment above the bottom portion, when the tackle box is open. The separate bins of the top portion have a bottom lining of soft, hook penetratable material to stabilize the positions of the hooks and lures within the top portion of the tackle box.

Thus, the tackle box of the invention provides the advantages, of, a number of readily available leader lines which can be quickly unreeled and cut, an easy-to-get-at pin on which a spool of fishing line can be placed for unreeling onto the reel of a fishing rod, a quick and easy measuring scale for ascertaining the length of a fish, and a special top lid portion in which lures and leader lines with hooks can be stored without fear of them becoming entangled with each other.

DESCRIPTION OF THE DRAWING

The following description of the invention will be better understood by having reference to the accompanying drawing, wherein.

ENVIRONMENT OF THE INVENTION

Figure 1:
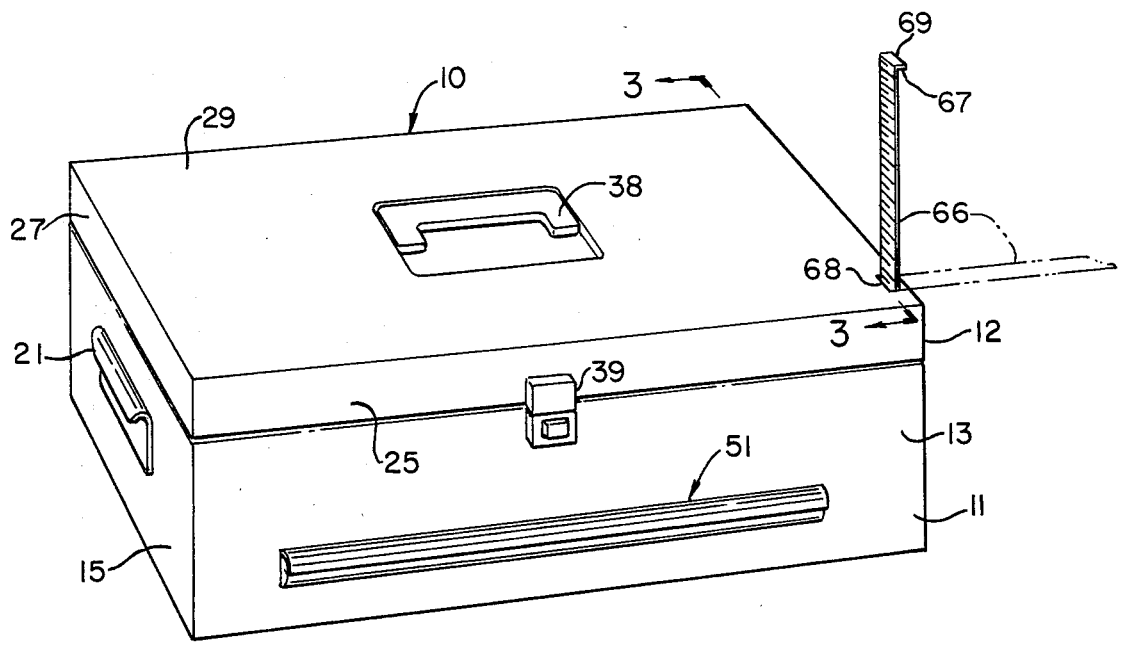
FIG. 1 is a perspective view of a fishing tackle box which is made in accordance with the invention, the box being shown in a closed position.
Figure 2:
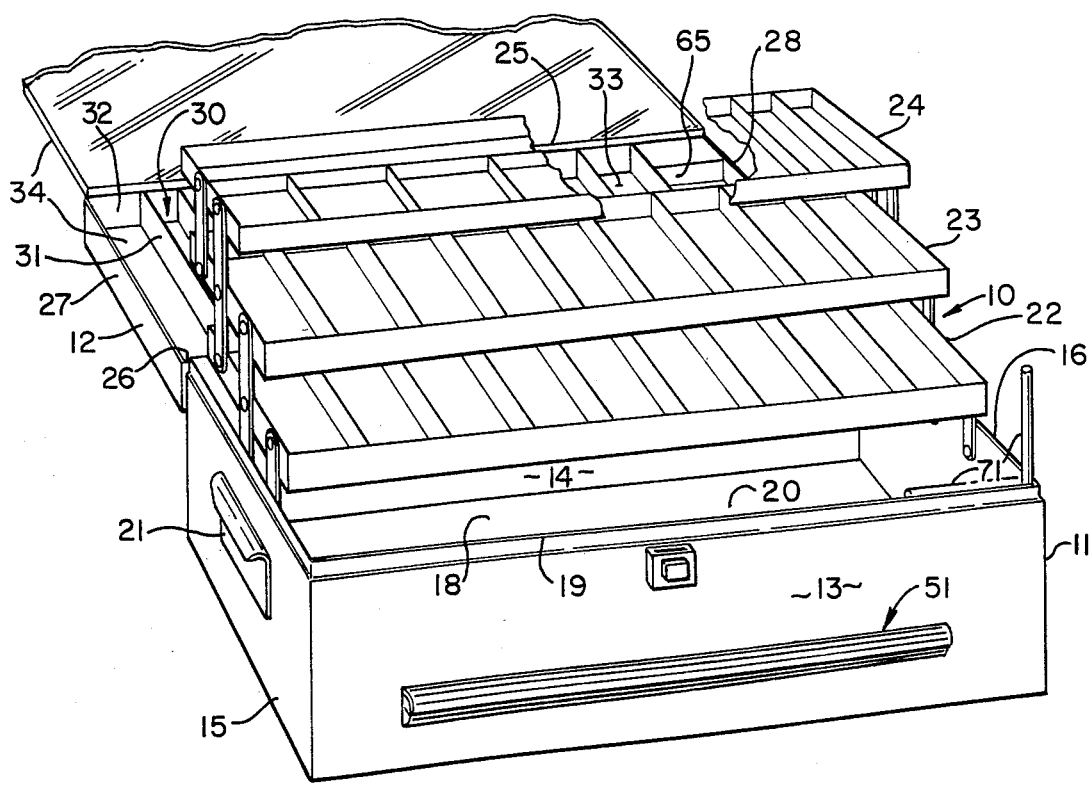
FIG. 2 is a perspective view of the tackle box in an open position.

With particular reference to FIGS. 1 and 2, there is shown a rectangularly-shaped fishing tackle box 10 in which fishing gear or tackle, such as hooks, spools of fishing line, leaders and lures, are stored. The tackle box 10, when horizontally disposed, comprises a bottom portion 11 and a top portion 12 which is hinged to the bottom portion 11 and acts as a lid or cover for the bottom portion 11 which is considerably larger than the top portion 12.

The bottom portion 11 includes a pair of opposing, parallel sidewalls 13,14 which extend longitudinally of the tackle box 10, a pair of opposing, parallel sidewalls 15,16 which extend transversely of the tackle box 10, and a bottomwall 17 which, together with the other walls 13–16, form a compartment 18 that has an open top 19 in vertical spaced relation above a closed bottom 20. The first sidewall 13 acts as the frontwall of the tackle box 10 and the second sidewall 14 acts as the backwall. The endwalls 15, 16 each have an exposed handle 21 by which the tackle box 10 can be picked up and moved around. A plurality of divided trays 22-24 for storing lures, weights or sinkers, etc., are conventionally linked together and pivotally mounted to the sidewalls 15,16, for rotation from a closed position where the trays are in vertical stacked relation within the compartment 18, as seen in FIG. 3, to an open position where the trays are in vertical spaced and stepped relation, as seen in FIG. 2.

The top cover portion 12 also has a frontside 25 and a backside 26 which are parallel and extend longitudinally of the tackle box 10, a pair of opposing, parallel endsides 27,28 which extend transversely of the tackle box 10, and a topside 29 which, together with the other sides 25–28, form a tray 30 which is divided by a plurality of dividers, e.g. divider 31, into a number of storage bins 32 which are shaped to hold a particular piece of fishing tackle. Note that the topside 29 of the tackle box 10 acts as the bottomside of the open tray 30. The bottomside 29 of the tray 30 is lined with any suitable material in which fishing hooks can be removably embedded, e.g. cork or styrofoam 33. A transparent lid 34 is removably positioned atop the open tray 30 to cover the storage bins 32 and prevent any fishing tackle stored therein, from falling out of the bins 32 when the top portion 12 is closed in covering relation over the bottom portion 11. This is accomplished by any suitable means. For example, a hinge 35 is used to hinge the lid 34 to the frontside 25 of the top portion 12, and a ball latch 36 is provided at the opposing side of the lid 34 to frictionally engage the backside 26 of the top portion 12. Any suitable handhold 37 is placed adjacent the ball latch 36 for grabbing by a fisherman to open and close the lid 34. A handle 38, recessed in the topside 29 of the top portion 12, is rotatable from the position of FIG. 1, to a vertical position for grabbing onto, and carrying, the tackle box 10, when the box is closed. Any suitable latching mechanism 39 is used for locking the top and bottom portions 12,11 together when the tackle box 10 is closed. The tackle box 10 is made of any appropriate material, such as wood, plastic, or metal.

THE INVENTION

Figure 3:
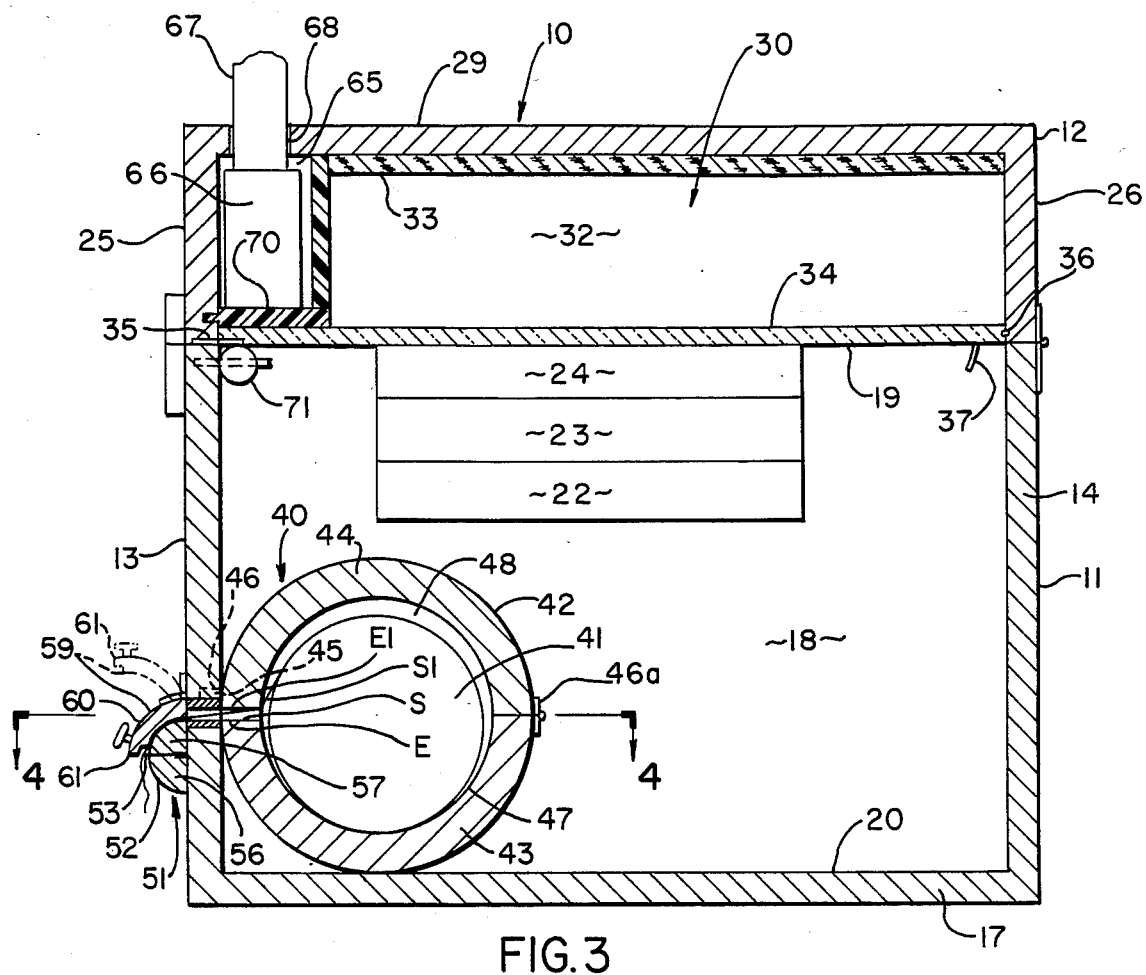
FIG. 3 is a section of the tackle box viewed from the line 3—3 of FIG. 1, the section being enlarged to show the housings for the spools of leader line, the housings also being viewed in cross-section to illustrate the position of the spool therein.
Figure 4:
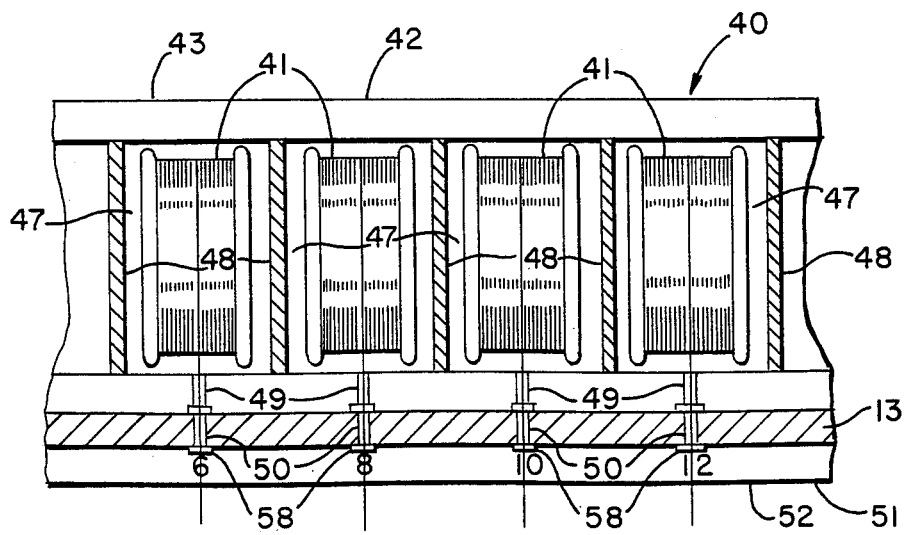
FIG. 4 is a section of a part of the housing, as viewed from the line 4—4 of FIG. 3.

With particular reference to FIGS. 3–4, there is shown a device 40 for handily storing a number of spools 41 of different gauge fishing or leader line to which are fastened the hooks and lures upon which fish become impaled and caught. The spool storage device 40 comprises a hollow cylindrical enclosure or casing 42 which is secured longitudinally of the tackle box 10 between the endwalls 15,16 of the bottom portion 11, adjacent the vertically lowermost bottom of the compartment 18 in abutting relation with the frontwall 13 and adjacent bottomwall 17 of the tackle box 10. The casing 42 includes a lower, semi-cylindrical section 43 which is secured to the frontwall 13 and adjacent bottomwall 17 by any suitable means, e.g. welding if the tackle box 10 is metallic, and an upper semi-cylindrical section 44 which is detachably mounted in juxtaposed position atop the lower section 43 by any appropriate means, e.g. alignment pins 45 which extend from the upper section 44 into matingly shaped slots or notches 46 in the frontwall 13 adjacent the lower section 43, and any suitable latching mechanism 46 at the other sides of the sections 43,44 to hold the sections 43,44 together.

The hollow casing 42 is longitudinally divided into a number of separate cylindrical housings or stalls, e.g. housing 47, by a number of circular-shaped dividers 48 which are secured in vertical, transverse relation within the lower section 43 of the casing 42. The housings 47 are big enough to hold the largest of spools 41 which are all circular, in shape, but which vary slightly, in size, i,e, the diameter and thickness of the spool, according to the manufacturer. Each of the separate housings 47 is provided with an opening 49 which is in horizontal alignment with a similar opening 50 in the frontwall 13 of the tackle box 10. Thus, the aligned openings 49,50 are in a row which extends longitudinally of the tackle box 10. The loose free ends of leader line from the spools 41, placed in the housings 47, are threaded through the adjacent openings 49,50, so that they extend exteriorly of the tackle box 10 where they are readily available for grabbing and pulling which causes the attached spool 41 to rotate freely about its center axis which is, generally, in horizontal alignment with the axes of the other spools 41. Thus, it can be said that the spools 41 will rotate about a common axis.

Any suitable cutting device 51 is provided exteriorly of the tackle box 10 for cutting leader line that has been unreeled from a spool 41. In this instance, the cutting device 51 comprises a semi-cylindrical bulbous portion 52 which protrudes longitudinally from the frontwall 13 of the tackle box 10 just below the row of openings 50 from which the leader lines extend. The bulbous portion 52 is coextensive with the row of openings 50 in the frontwall 13, and includes a knife edge 53 which protrudes horizontally from the bulbous portion 52 midway between the opposing marginal edges 54,55 thereof. The bulbous portion 52 can be designed to accommodate, adjacent each of the openings 50, a single edge razor blade to cut leader line from that particular opening. The knife edge 53, whether continuous, or a number of single edge razor blades, is detachably mounted on the bulbous portion 52 by any suitable means, so that a dulled knife edge can be easily removed and replaced. For example, the bulbous portion 52 can comprise a lower segment 56 which is secured to the frontwall 13, and an upper segment which is removably mounted atop the lower segment 56, both segments 56,57 being shaped to hold the particular knife edge 53 being used. The openings 50 in the frontwall 13 may be provided with rubber grommets 58 which have small holes through which the leader line passes and, in which, the line is compressively engaged to prevent unnecessary unreeling of the line. The grommets 58 also act to prevent water from entering the tackle box 10 through the openings 50. It can be imagined that the use of rubber grommets 58 is somewhat impractical, since a special needle and considerable care are required to thread the leader line through the tiny openings or holes in the grommets 58.

A much simpler and more economical solution is to provide the abutting, continuous, opposing marginal edges E,E1 of the sections 43,44 of the casing 42, closest the frontwall 13, with strips S,S1 of rubberized or felt-like material which compressively engage each other and the leader lines between them, when the sections 43,44 are securely locked together. This eliminates the need for drilling the holes or openings 49 in the casing 42. The edge liners or strips S,S1 of felt also act to block and waterproof the adjacent openings 50 in the frontwall 13, which openings 50 guide the leader lines from their respective housings or stalls 47. Thus, a continuous felt-lined slit is formed in the casing 42 in horizontal alignment with the row of openings 50 in the frontwall 13 of the tackle box 10. The leader lines are easily threaded through the openings 50 in the frontwall 13, when the upper or top section 44 is removed from the lower or bottom section 43 of the casing 42.

Although not shown, it should be readily apparent from a study of FIG. 4 in conjunction with FIG. 2, that there will be at least one large, empty housing or stall 47 between the first and last openings 50 in the frontwall 13, and the adjacent endwalls 15,16, of the tackle box 10. Such empty stalls 47 are used to store extra spools 41 of leader line which is most frequently used.

A protective cover 59 is provided for the knife edge 53 to keep it sharp and prevent someone from being accidentally cut by it. In this case, the protective cover 59 comprises a matingly shaped parti-cylindrical body 60 which covers the upper segment 57 and which has a free, distal marginal edge 61 which is offset to overlap the knife edge 53, without actually contacting it. The marginal edge of the body 60, opposite the distal edge 61, is hinged to the frontwall 13, so that the protective cover 59 can be rotated away from the bulbous portion 52 to the position shown in dotted line in FIG. 3, the cover 59 being held in this position for the time desired, by any suitable means, e.g. magnet 62 when the protective cover 59 is made of metal. The protective cover 59, or the upper segment 57 of the bulbous portion 52, if desired, is provided with indicia, adjacent each of the openings 50, to indicate the size or gauge of the leader line which extends from the openings 50 in the frontwall 13. Thus, a fisherman will know exactly where the different gauge leader lines are located.

The top cover portion 12, as best seen in FIGS. 1 and 3, is provided with a hollow chamber 65 in which is located a flexible spring-biased tape measure 66 for measuring the length of a fish. The tape measure 66 has a free distal end 67 which extends exteriorly of the tackle box 10 through a slot 68 in the topside 29 of the top cover portion 12, and which has a stop 69 to prevent the distal end 67 from being retracted through the slot 68 into the chamber 65 where it is out of reach. The chamber 65 has a sliding door 70 which can be removed so that the tape measure 66 can be removed and replaced, if desired. The topside 29 of the top cover portion 12 acts as an abutment from which a fish is measured, when the fish is held in a vertical position above the closed tackle box 10. The tape measure 66 is moved to the horizontal dotted position of FIG. 1, where the markings on the tape measure 66 are easily read. Thus, the length of a fish is measured with a minimum of effort.

A solid, pivot pin 71 on which a spool 41 of fishing line is mounted for unreeling onto the reel of a fishing rod, is pivotally mounted on the frontside 13 of the tackle box 10 by any suitable means for rotation from a first position where the pin 71 is longitudinally disposed within the compartment 18, as shown in dotted line in FIG. 2, to a second position where the pin 71 extends vertically out of the compartment 18, so that it is readily available for the placement of a spool 41 of fishing line thereon, when the tackle box 10 is open.

Thus, there has been described a unique fishing tackle box which holds, and makes readily available to a fisherman, a number of different gauge leader lines. Also, the measuring of the length of a fish has been greatly simplified from a system which normally required one person to hold the fish, and another person to measure the fish. This unique tackle box also provides a holder for a spool of fishing line as it is transferred to the reel of a fishing rod. In addition, there is the unusual transparent lid that is provided to close the storage bins that are provided in the top tray of the top cover portion of the tackle box. Moreover, these storage bins have a bottom lining in which the hooks of fishing lures can be embedded to stabilize the positions of the lures within the tackle box.

What is claimed is:

1. A fishing tackle box which, when horizontally disposed, comprises:
   (a) a bottom portion, including:
      (I) a pair of opposing sidewalls which extend in parallel relation longitudinally of the box, one of the sidewalls being the frontwall and the other of the sidewalls being the backwall;
      (II) a pair of opposing, parallel endwalls connecting the sidewalls at opposing ends thereof;
      (III) a bottomwall secured to the sidewalls and endwalls and forming with them, a compartment which has an open top in vertical spaced relation above a closed bottom;
   (b) a top portion which is hinged to the bottom portion and which is rotatable into and out of closing relation with the bottom portion and the open top of the compartment therein;
   (c) means in the compartment adjacent one of the sidewalls, for mounting a number of spools of fishing leader line for rotation about generally the same axis which parallels the adjacent sidewall which has a similar number of openings through which leader line from the spools extend exteriorly of the tackle box, the means including:
      (I) a hollow cylindrical casing which has an inside diameter that is larger than the outside diameter of the spools, the casing having a longitudinal center axis; and
      (II) means for holding the spools of leader line in side-by-side longitudinally spaced, parallel relation within the casing, including a number of flat, circular dividers disposed within the casing at right angles to the longitudinal center axis thereof, the dividers being longitudinally spaced and coacting with the casing to form therein, a number of separate housings in which the spools of leader line are free to rotate about their own center axes, when leader line, attached to the spools and extending exteriorly from the tackle box, is pulled;
   the casing including:
      (I) a pair of opposing, semi-cylindrical sections having a top section which is vertically above a bottom section;
      (II) means for securing the dividers to the bottom section in vertical upstanding relation; and
      (III) means for detachably mounting the top section of the bottom section, so that spools of leader line can be easily placed in, and removed from, the housings;
   (d) means exteriorly of the tackle box adjacent the openings through which the leader lines extend exteriorly of the box, for cutting the lines; and
   (e) means coacting with the cutting means for at least partially covering the cutting means to protect said means and prevent anyone from being cut by the cutting means, including a semi-cylindrical bulbous portion which extends outwardly from the tackle box just below the row of openings from which the leader lines extend exteriorly of the box, the bulbous portion being coextensive with the row of openings, and a sharp knife edge protruding horizontally from the bulbous portion.

2. The tackle box of claim 1, wherein the row of openings for the leader lines is in the frontwall of the bottom portion, and the casing extends between the endwalls in abutting relation with the frontwall and adjacent bottomwall of the bottom portion.

3. The tackle box of claim 2, wherein the top cover portion includes:
(k) a pair of opposing, parallel sides which extend longitudinally of the tackle box;
(l) a pair of opposing, parallel endsides which connect with the sides at opposing ends thereof;
(m) a topside secured to the sides and endsides and forming with them a chambered tray;
(n) means for dividing the tray into a number of storage bins for holding fishing tackle;
(o) a transparent lid for covering the storage bins, to prevent fishing tackle, stored in the bins, from falling out of the bins when the top portion is closed in covering relation with the bottom portion; and
(p) means for mounting the lid for removal out of covering relation with the storage bins, when the top portion is open out of covering relation with the bottom portion.

4. The tackel box of claim 3, which includes:
(q) means associated with the top portion and extensible therefrom, for measuring the length of a fish, when the top portion is closed in covering relation with the bottom portion.

5. The tackle box of claim 4, wherein the fish measuring means includes, (I) a chamber formed in the top portion adjacent the topside thereof, (II) a slot disposed in the topside in communication with the chamber, (III) a spring biased flexible measuring tape disposed in the chamber and having a free distal end which extends exteriorly of the tackle box through the slot in the topside which acts as an abutment to keep the tape from being completely withdrawn from the chamber and an abutment from which a fish is measured using the tape, and (IV) means for opening and closing the chamber to permit the placement and removal of the measuring tape.

6. The tackle box of claim 5, which includes:
(r) a cylindrical pivot pin on which a spool of fishing line can be mounted for rotating freely about its own longitudinal center axis; and
(s) means for mounting the pivot pin for rotation from a first position within the compartment of the bottom portion, to a second position where the pivot pin extends vertically above the open top of the compartment adjacent the frontside, when the top portion is open and not in covering relation with the bottom portion.

7. The tackle box of claim 6, which includes:
(t) a plurality of compartmented trays for storing fishing tackle in the compartment of the bottom portion, when the tackle box is closed; and
(u) means for linking the compartmented trays together and to the endwalls for rotation from a first position where the compartmented trays are vertically stacked and aligned within the compartment of the bottom portion, to a second position where the trays are in stepped relation substantially outside and vertically above the compartment of the bottom portion for easy access.

8. The tackle box of claim 7, which includes a lining for the topside of the storage bins farthest from the lid, the lining being composed of a material which fish hooks can become embedded and from which embedded hooks can be removed.

9. The tackle box of claim 8, wherein the means for partially covering and protecting the cutting means include a parti-cylindrical cover which is hinged to the frontside in covering relation with the row of openings and which is rotatable therefrom out of covering relation with the openings of said row, and means coacting with said cover for holding the cover out of covering relation with said openings.

10. The tackle box of claim 9, which includes means contacting line unreeled from the spools for preventing the slippage of line therepast to prevent unnecessary unreeling of line from the spools.

11. The tackle box of claim 10, wherein the casing for the spools, includes openings which are in alignment with the openings of said row of openings in the frontside of the tackle box, and the means for preventing the slippage of line, include elastomeric grommets disposed in the aligned openings for compressively engaging line passing therethrough.

12. The tackle box of claim 11, which includes means for indicating the gauge of the leader line passing through the openings of said row of openings.

13. The tackle box of claim 12, wherein the parti-cylindrical cover has a free distal end which is offset to cover the knife edge while not contacting it, and the bulbous portion is designed to receive and hold a single edge razor blade adjacent each of the openings as a knife edge for cutting leader line.

14. A fishing tackle box, comprising:
(a) a compartment in which fishing tackle is stored, the compartment having a sidewall which has a plurality of aligned openings therein;
(b) means within the compartment adjacent the sidewall, for holding a plurality of spools of fishing line in side-by-side parallel relation where the spools are free to rotate about their respective axes, the means holding the spools such that fishing line can pass from a spool exteriorly of the tackle box through an adjacent opening in the sidewall;
(c) means disposed on the sidewall exteriorly of the tackle box and compartment therein adjacent each of the openings in the sidewall, for cutting fishing line exteriorly of the tackle box;
(d) means for at least partially covering the cutting means to protect it and help prevent anyone from accidently cutting themselves on the cutting means; and
(e) means mounting the covering means (d) on the sidewall exteriorly of the tackle box for movement into and out of at least partial covering relation with the cutting means.

15. The fishing tackle box of claim 14, wherein the spool holding means (b) includes:
(f) a hollow cylindrical casing which extends longitudinally of the sidewall of the compartment, the casing having, (I) a semi-cylindrical bottom section in which the spools are supported, (II) a semi-cylindrical top section for covering the bottom section, (III) means for detachably mounting the top section on the bottom section, and (IV) means spaced longitudinally within the hollow casing for dividing the casing into a plurality of generally cylindrical housings in which the spools of fishing line are separately housed for rotation in generally parallel planes.

16. The fishing tackle box of claim 15, which includes:
(g) means for compressively engaging fishing line as it passes from the spools through the openings in the sidewall, to prevent unnecessary unreeling of fishing line from the spools.

17. The fishing tackle box of claim 16, wherein the cutting means (c) includes:
- (h) a sharp knife edge which spans each of the openings in the sidewall; and
- (i) means for holding the knife edge in outstanding relation vertically below the openings in the sidewall, when the tackle box is in a horizontal position.

18. The fishing tackle box of claim 17, wherein the knife edge is continuous and coextensive with the openings in the sidewall, and the means (i) for holding the knife edge includes a semi-cylindrical bulbous portion which is at least coextensive with the knife edge and from which the knife edge protrudes between opposing longitudinal marginal edges of the bulbous portion, and the means (d) for at least partially covering the cutting means includes a parti-cylindrical cover which is designed to cover the openings in the sidewall, the part of the bulbous portion closest the openings, and at least a part of the knife edge, when the covering means (d) is in at least partially covering relation with the cutting means.

19. The fishing tackle box of claim 18, wherein the means (g) for compressively engaging fishing line includes a pair of casing sections which, adjacent the openings in the sidewall, have a pair of spaced, confronting marginal edges which are covered with a material which compressively engages and resists movement of fishing line therebetween.

* * * * *